Patented July 26, 1927.

1,636,818

UNITED STATES PATENT OFFICE.

FELIX HOMBERG, OF BARMEN, GERMANY, ASSIGNOR TO AMERICAN NUPLAX CORPORATION, OF NEW YORK, N. Y., A CORPORATION OF DELAWARE.

PROCESS FOR THE TREATMENT OF HORN OR THE LIKE.

No Drawing. Application filed December 30, 1924, Serial No. 758,959, and in Germany January 7, 1924.

As is well known very large quantities of albumenous substances are obtained when slaughtering animals, without there being any satisfactory use in practice of these substances for commercial purposes. Amongst these there is firstly horn, of which only a small part is used for the production of buttons and combs, whilst another part after roasting and grinding is used as manure. This has valuable properties but for numerous reasons it is only used very unwillingly and to a relatively small extent. On the other hand it is known that horn is not digested by the hydrochloric acid of the stomach and is only digested to an extremely small extent in the alkaline bowel digestive processes. It would therefore be very important if it were possible to produce completely digestible albumen from horn.

It is known that horn can be dissolved in strong lyes or acids whilst disturbing its chemical and physical properties and that albumenous substances can again be precipitated from the solution by acid, alkaline, or salt precipitating agents. Thereby however large quantities of albumen are decomposed to such an extent (for example in amino acids) that they are no longer precipitated, that is they are lost, and that albumen not decomposed to this extent and which is therefore being precipitated has also mostly already lost nutritive factors (for example sulphur) and has therefore become of less value. Such a process for the extraction of albumen would therefore lead to considerable losses.

The invention has for its object the provision of a process for obtaining economically from indigestible albumen, for example horn, digestible albumen which is only slightly decomposed. The process consists therein that horn, even in large pieces, is preferably exposed for some hours to the action of an acid, preferably a concentrated acid, in such a manner that the pieces of horn are covered by the acid. The duration of the action depends upon the nature of the pieces of horn, which vary according to class, age and nourishment of the animals. Thereafter the pieces of horn are taken out of the acid and left in closed chambers and finally watered for several days. The pieces of horn are thus softened completely and are converted into a white albumen similar to cooked fish flesh, which can be dried, and comminuted without trouble into the finest powder. The albumen thus obtained is capable of use as fodder and may also be used as a substitute for many other fattening foods.

Hydrochloric acid has been found particularly suitable for this process and can be used either in the form of liquid or gas or as vapour.

The softened mass obtained according to the new process may be moulded or operated upon easily and by treatment with chemicals may be again hardened so that if desired it may also be used as an artificial mass for various technical purposes.

What I claim is:

1. Process for the treatment of horn and the like more particularly for the production of digestible albumen, comprising, soaking horn with acid at a temperature below the boiling point of the acid, allowing the horn to stand, continuing both these steps for only such limited time that the horn is softened but not dissolved, then treating the horn with water, and then drying and comminuting the horn.

2. Process for the treatment of horn and the like more particularly for the production of digestible albumen, comprising, soaking horn with concentrated acid at a temperature below the boiling point of the acid, allowing the horn to stand, continuing both these steps for only such limited time that the horn is softened but not dissolved, then treating the horn with water, and then drying and comminuting the horn.

3. Process for the treatment of horn and the like more particularly for the production of digestible albumen, comprising, soaking horn with hydrochloric acid at a temperature below the boiling point of the acid, allowing the horn to stand, continuing both these steps for only such limited time that the horn is softened but not dissolved, then treating the horn with water, and then drying and comminuting the horn.

4. Process for the treatment of horn and the like more particularly for the production of digestible albumen, comprising, soaking horn with concentrated hydrochloric acid at a temperature below the boiling point of the acid, allowing the horn to stand, continuing both these steps for only such limited time that the horn is softened but not dissolved, then treating the horn with water, and then drying and comminuting the horn.

5. Process for the treatment of horn and the like more particularly for the production of digestible albumen, comprising, soaking horn with acid at atmospheric temperature, allowing the horn to stand, continuing both these steps for only such limited time that the horn is softened but not dissolved, then treating the horn with water, and then drying and comminuting the horn.

6. Process for the treatment of horn and the like more particularly for the production of digestible albumen, comprising, soaking horn with concentrated hydrochloric acid at atmospheric temperature, allowing the horn to stand, continuing both these steps for only such limited time that the horn is softened but not dissolved, then treating the horn with water, and then drying and comminuting the horn.

7. Process for the treatment of horn and the like more particularly for the production of digestible albumen, comprising, soaking horn with acid at a temperature below the boiling point of the acid, allowing the horn to stand, continuing both these steps for only such limited time that the horn is softened but not dissolved, and then treating the horn with water.

8. Process for the treatment of horn and the like more particularly for the production of digestible albumen, comprising, soaking horn with concentrated acid at a temperature below the boiling point of the acid, allowing the horn to stand, continuing both these steps for only such limited time that the horn is softened but not dissolved, and then treating the horn with water.

9. Process for the treatment of horn and the like more particularly for the production of digestible albumen, comprising, soaking horn with hydrochloric acid at a temperature below the boiling point of the acid, allowing the horn to stand, continuing both these steps for only such limited time that the horn is softened but not dissolved, and then treating the horn with water.

10. Process for the treatment of horn and the like more particularly for the production of digestible albumen, comprising, soaking horn with concentrated hydrochloric acid at a temperature below the boiling point of the acid, allowing the horn to stand, and then treating the horn with water.

11. Process for the treatment of horn and the like more particularly for the production of digestible albumen, comprising, soaking horn with acid at atmospheric temperature, allowing the horn to stand, and then treating the horn with water.

12. Process for the treatment of horn and the like more particularly for the production of digestible albumen, comprising, soaking horn with concentrated hydrochloric acid at atmospheric temperature, allowing the horn to stand, and then treating the horn with water.

In testimony whereof I affix my signature.

FELIX HOMBERG.